United States Patent Office 3,086,009
Patented Apr. 16, 1963

3,086,009
PROCESS FOR PREPARING A WATER SOLUBLE HYDROLYZED STARCH-FERRIC IRON COMPLEX
Fred Zuschek, John P. Towey, and Norman K. Jungk, Des Moines, Iowa, assignors, by mesne assignments, to Diamond Laboratories, Inc., Des Moines, Iowa, a corporation of Iowa
No Drawing. Filed July 19, 1960, Ser. No. 43,706
11 Claims. (Cl. 260—233.3)

This application is a continuation-in-part of application Serial No. 812,812 filed May 13, 1959 now abandoned.

This invention relates to the manufacture of therapeutic preparations containing nonionic iron in a form suitable for use in parenteral injection.

The use of the so-called saccharated iron oxide is well known for injection purposes in the treatment of iron-deficiency anemia and the like. Such preparations have the disadvantages of possible toxic effects, relatively strong alkalinity, inflammation at the site of injection and lack of absorption.

Recently it has been proposed to replace such saccharated iron oxide by a nonionic ferric hydroxide-dextran complex. In such process the dextran employed must be specially prepared by first polymerizing sucrose with the aid of appropriate microorganisms and then the dextran must be carefully depolymerized to a relatively narrow range of intrinsic viscosity.

It is an object of the present invention to prepare a composition containing substantially nonionic iron for the treatment of iron-deficiency anemia which eliminates the disadvantages of the saccharated iron oxide and ferric hydroxide-dextran complexes recited above.

An additional object is to prepare a water soluble complex of ferric iron and partially hydrolyzed starch or other glucose polymers which can be used to treat iron-deficiency anemia which is well tolerated and can be injected, e.g., either intramuscularly or intravenously, without undesirable side effects.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by acid digesting a starch or a starch dextrin and complexing the acid hydrolysate with ferric hydroxide and then fractionating the complex with methyl alcohol. The methyl alcohol insoluble product is then filtered and dried to remove the methyl alcohol and the resulting powder is dissolved in an aqueous solution to form a water soluble nonionic ferric iron acid digested starch complex. Starch dextrin can be acid hydrolyzed to a simpler dextrin.

The general procedure employed is as follows.

The starch or starch dextrin is slurried in distilled or deionized water. It is then heated, e.g., 70 to 80° C., to solubilize the starch. Then an acid, e.g., hydrochloric acid, sulfuric acid, nitric acid, hydrobromic acid, phosphoric acid, trifluoroacetic acid, trichloroacetic acid or any other strong acid is added to hydrolyze the starch or dextrin. It has been found convenient to utilize soluble starch to reduce the hydrolysis time. The acid hydrolysis is continued until the starch is hydrolyzed to a ferricyanide reducing value from about 35 to about 270. Any convenient source of starch or starch dextrin can be utilized such as potato starch, corn starch, tapioca starch, wheat starch, rice starch, cassava starch, corn dextrin, potato dextrin, wheat dextrin, tapioca dextrin, etc. The preferred polymers employed are D-glucose polymers, most preferably 1,4-a-D-glucopyranosido polymers.

The hydrolysis is continued until there is prepared an oligosaccharide having a ferricyanide value of between 50 and 260. The ferricyanide value of a carbohydrate is defined as the amount of 0.1 N sodium thiosulfate solution consumed by one gram of the carbohydrate sample. The ferricyanide value or number for corn starch is 1, for maltose is 270 and for dextrose is 310.

Then a water soluble ferric salt, e.g., ferric chloride, ferric nitrate, ferric sulfate, or ferric ammonium sulfate in either hydrous or anhydrous form is dissolved in deionized or distilled water.

The ferric salt solution is then added to the acid digested starch or starch and mixed thoroughly in an amount equivalent to 25 to 71.5 gms. of ferric chloride per 100 grams of starch or starch dextrin.

There is then slowly added with thorough mixing a dilute aqueous solution of an alkali such as sodium hydroxide, potassium hydroxide, ammonium hydroxide mixing to give a pH in the high alkaline range, e.g., 9–14.

There is then added sufficient methyl alcohol, preferably of 100% concentration, to form a precipitate. Usually 0.5 to 2 parts by weight of methyl alcohol are employed per part of starch-iron solution. The supernatant liquid is removed and the precipitate is washed with methyl alcohol a plurality of times. The wash liquid can be 100% methyl alcohol or more dilute, e.g., 50% methyl alcohol. Instead of utilizing methyl alcohol to precipitate the complex and as a wash liquor there can be employed other water soluble lower alkanols such as ethyl alcohol or isopropyl alcohol. By the use of the alcohol all of the mono and disaccharides which may be present, are precipitated.

The precipitate is then dried and ground and can be stored as such. The product can also be packaged as an aqueous solution by dissolving the precipitate in distilled or deionized water to give a solution containing 10–100, preferably 40–75 mg. of iron per milliliter, for example. The final pH is usually adjusted to 7.0 to 7.5 and preferably to 7.2 to 7.3 for purpose of injection. The final solution can be sterilized in conventional fashion, e.g., using 10 lbs./sq. in. steam pressure for 30 minutes, or by filtration through a suitable bacteriological filter. This solution is stable at a pH range from about 4.5 to 11.

In testing a preparation according to the present invention for intramuscular toxicity in mice it was not possible to inject quantities large enough to kill because of the limitations of quantity in intramuscular injections. This material was injected intramuscularly and subcutaneously into guinea pigs. The iron complex solutions were non-toxic up to a level of 2.5 g. iron/kg.

The starch or starch dextrin-iron complexes of the present invention are non-toxic and can be injected in solution parenterally, e.g., subcutaneously or intramuscularly, and are suitable for veterinary use for therapeutic purposes. They have been employed successfully, for example, with mice, swine, dogs, guinea pigs, horses and cattle.

Throughout the specification and claims unless otherwise indicated, all parts and percentages are by weight.

*Example*

100 pounds of soluble starch (ACS Soluble Starch Morningstar D–1127, ferricyanide value 20.7) was slurried with 24 gallons of water and heated to 70° C. with the aid of a steam jacket on the container. There was then added 7.2 liters of concentrated hydrochloric acid (37%) with stirring. The mixture was maintained at 70°±2° C. for 45 minutes. The steam was turned off and tap water was circulated through the jacket for 10 minutes. The hydrolyzed soluble starch had a ferricyanide value of 58.0. While the addition of iodine to an aqueous solution of the original starch produced a blue color, the addition of iodine to an aqueous solution of a hydrolyzed starch prepared above produced a blue-purple color. Then 71 pounds and 8 ounces of ferric chloride hexahydrate was added to the hydrolyzed starch together with 50 pounds of cracked ice over a period of five minutes. The temperature dropped to 30–35° C. Next there was added gradually 18 gallons of a sodium hydroxide solution containing 52.5 pounds of sodium hydroxide. The addition of sodium hydroxide solution was regulated so that the final temperature was 55–60° C. and mixing was continued for an additional 30 minutes. The product which was a uniform solution was cooled to 45° C. and then 75 gallons of 100% methyl alcohol was added and a precipitate formed. The supernatant liquid was decanted and 75 gallons of 50% methyl alcohol were added. The supernatant fluid was again removed and a further 75 gallons of 50% methyl alcohol were added. This was also removed by decantation and 75 gallons of 100% methyl alcohol added and well mixed with the precipitate. The methyl alcohol was decanted and 25 gallons of 100% methyl alcohol added and mixed thoroughly with the precipitate. The slurry was transferred to a vacuum filter and the slurry allowed to drain until most of the supernatant fluid was removed. Then the vacuum was turned on and the precipitate was washed with 90 gallons of 100% methyl alcohol. The product was vacuum dried overnight, passed through a 4 mesh screen and dried at 135° F. The powder was then passed through an 8 mesh screen.

The product was dissolved in water to give a concentration of 50 milligrams of iron per milliliter and neutralized with hydrochloric acid to an approximate pH of 7. This solution was injected into guinea pigs, using doses of 2, 4 and 6 ml. All the guinea pigs survived. In place of hydrochloric acid there can be utilized any other nontoxic acid. Neutralization may also be accomplished by stirring the mixture with a cation exchange resin such as Dowex–50 (a sulfonated copolymer of styrene and a minor proportion of divinyl benzene) or Amberlite IR 120 (a sulfonated copolymer of styrene with a minor proportion of divinyl benzene) or Amberlite IRC 50 (a cross-linked polymer of an acrylic acid) or any other cation exchange resin which will remove alkali ions from solution. The solution is then diluted to contain about 50 mg. Fe per milliliter. The product, after sterilization, is ready for use as an injectable solution.

To the final solution there can be added phenol in an amount of 0.005 grams per milliliter as a preservative.

We claim:

1. The process of preparing a water soluble hydrolyzed starch-ferric iron complex comprising adding a water soluble ferric salt to aquous hydrolyzed starch having a ferricyanide value of between 50 and 260, adding an aqueous solution of a water soluble alkali and precipating the complex by the addition of a nonsolvent for the complex.

2. A process according to claim 1 wherein the nonsolvent is methyl alcohol and the alkali is selected from the group consisting of sodium hydroxide, potassium hydroxide and ammonium hydroxide.

3. A process of preparing a water soluble hydrolyzed starch-ferric iron complex comprising acid hydrolyzing soluble starch having a ferricyanide value of between 50 and 260, adding a water soluble ferric salt to the acid hydrolyzed soluble starch, adding an aqueous solution of a water soluble alkali and precipitating the complex with methyl alcohol.

4. A process of preparing a water soluble hydrolyzed starch-ferric iron complex acid hydrolyzing a starch dextrin to a simpler dextrin having a ferricyanide value of between 50 and 260, adding a water soluble ferric salt to the acid hydrolyzed dextrin, adding an aqueous solution of a water soluble alkali and precipitating the complex with methyl alcohol.

5. The process of preparing a water soluble hydrolyzed starch-iron complex comprising adding a water soluble ferric salt to an acidic aqueous hydrolyzed starch having a ferricyanide value of between 50 and 260 and then adding a water solube alkali to raise the pH to at least 9.

6. A process according to claim 5 including the additional step of precipitating the hydrolyzed starch-iron complex by the addition of a water soluble lower alkanol and wherein said alkali is a member of the group consisting of sodium hydroxide, potassium hydroxide and ammonium hydroxide.

7. A process according to claim 1 wherein the nonsolvent is a lower alkanol.

8. A process according to claim 3 wherein the acid employed to hydrolyze the starch is hydrochloric acid.

9. A 1,4-α-D-glucose polymer-ferric iron complex wherein the D-glucose polymer has a ferricyanide reducing value of between 50 and 260, said complex being characterized by forming a stable aqueous solution at a pH within the range of 4.5 to 11, said D-glucose polymer being selected from the group consisting of hydrolyzed starch and dextrin.

10. A water soluble hydrolyzed starch-ferric iron complex wherein the hydrolyzed starch has a ferricyanide value of 50–260, said complex being characterized by forming a stable aqueous solution at a pH within the range of 4.5 to 11.

11. A complex according to claim 10 wherein the hydrolyzed starch has a ferricyanide value of 58.

References Cited in the file of this patent

UNITED STATES PATENTS

| | | |
|---|---|---|
| 2,518,135 | Gaver | Aug. 8, 1950 |
| 2,820,740 | London et al. | Jan. 21, 1958 |
| 2,885,393 | Herb | May 5, 1959 |

OTHER REFERENCES

Bastisse: Chemical Abstracts, vol. 44, 1950, p. 5527g.
Lucas et al.: "Blood," vol. 7, 1952, pp. 358–367.